(12) United States Patent
Williamson

(10) Patent No.: US 11,535,072 B2
(45) Date of Patent: Dec. 27, 2022

(54) TRAILER LOCK

(71) Applicant: Christopher H. Williamson, Wichita, KS (US)

(72) Inventor: Christopher H. Williamson, Wichita, KS (US)

( * ) Notice: Subject to any disclaimer, the term of this patent is extended or adjusted under 35 U.S.C. 154(b) by 968 days.

(21) Appl. No.: 16/291,201

(22) Filed: Mar. 4, 2019

(65) Prior Publication Data
US 2019/0193497 A1 Jun. 27, 2019

Related U.S. Application Data

(60) Provisional application No. 62/665,735, filed on May 2, 2018.

(51) Int. Cl.
*B60D 1/60* (2006.01)
*B60D 1/06* (2006.01)

(52) U.S. Cl.
CPC ..... *B60D 1/60* (2013.01); *B60D 1/06* (2013.01)

(58) Field of Classification Search
CPC ........................................................ B60D 1/60
See application file for complete search history.

(56) References Cited

U.S. PATENT DOCUMENTS

| | | | | |
|---|---|---|---|---|
| 4,571,964 A * | 2/1986 | Bratzler | ............... | B60D 1/60 280/507 |
| 4,730,841 A * | 3/1988 | Ponder | ............... | B60D 1/60 70/258 |
| 5,775,139 A * | 7/1998 | Sellers | ............... | B60D 1/60 70/164 |
| 6,244,614 B1 * | 6/2001 | Bonvillain | ............... | B60D 1/60 280/507 |
| 6,598,432 B1 * | 7/2003 | Dwyer | ............... | B60D 1/60 280/507 |
| 8,556,288 B1 * | 10/2013 | Bale | ............... | B60D 1/60 280/507 |
| 9,033,358 B1 * | 5/2015 | Williamson | ............... | B60D 1/06 280/507 |
| 10,513,159 B2 * | 12/2019 | Odom | ............... | B60D 1/60 |
| 2010/0230932 A1 * | 9/2010 | Pratt | ............... | B60D 1/56 280/507 |

* cited by examiner

*Primary Examiner* — Kevin Hurley
(74) *Attorney, Agent, or Firm* — Kenneth H. Jack; Davis & Jack, L.L.C.

(57) ABSTRACT

A lock for securing a hitch coupler and safety chain hooks, the hitch coupler being attached to a trailer's towing tongue and the safety chains and hooks being attached to the towing tongue, the lock incorporating a primary lock including an enclosure having a floor and a ceiling; a bolt attached to and extending into the enclosure from the floor; a seam segmenting the enclosure and facilitating movements of the ceiling between a first and second positions, wherein, upon movement of the ceiling to the first position, the ceiling overlies the bolt, and upon movement toward the second position, the ceiling displaces from the first position; a releasable latch attached to the primary lock, the releasable latch being adapted for resisting movements of the ceiling; and a secondary lock incorporating a hitch coupler lower surface and the chain hook receiving eye.

13 Claims, 4 Drawing Sheets

TRAILER LOCK

CLAIM OF PRIORITY FROM PREVIOUSLY FILED PROVISIONAL PATENT APPLICATION

This non-provisional patent application claims the benefit of and priority from U.S. Provisional Patent Application No. 62/665,735 filed May 2, 2018. The inventor disclosed in and applicant of said provisional application are the same as the inventor in and applicant of the instant application. The applicant asserts that structures and functions of structures disclosed and described in the instant application are substantially identical to those disclosed in said provisional application.

FIELD OF THE INVENTION

The instant invention relates to trailers of the type which include a forward hitch ball engaging trailer tongue coupler, and include bumper engaging safety chains. More particularly, this invention relates to locks which connect operatively to such trailers for impeding unauthorized trailer towing.

BACKGROUND OF THE INVENTION

Trailer locks are known to be variously formed and configured for attaching to a trailer's forward tongue coupler, and for disabling and interfering with unauthorized utilization of such tongue coupler for trailer towing. Such trailer locks are conventionally intended for reducing the risk of theft of a trailer.

A problem associated with such common trailer locks arises as a result of the presence of safety chains which are commonly attached to a trailer's tow tongue to provide continuity of trailer towing in the event that the trailer's primary tongue coupler fails or otherwise disconnects during towing. In order to perform such safety function, such chains include hooks, and are adapted to, on an emergency basis, alternatively perform the trailer towing function. Just as such hooks and chains are capable of towing the trailer during an emergency towing back-up event, such hooks and chains are capable of being intentionally utilized by a trailer thief as a primary towing means.

Commonly known trailer locks are typically incapable of performing any function of disabling or interfering with a thief's intentional utilization of a trailer's safety hooks and chains. Accordingly, such common and conventional trailer locks may undesirably allow a thief to alternatively utilize unsecured trailer hooks and chains for towing of the trailer in order to accomplish a theft of a trailer.

The instant inventive trailer lock solves or ameliorates the problems and defects described above by incorporating within a trailer tongue lock specially adapted structures which secure tow chains against unauthorized use simultaneously with locking and securing the trailer's tongue coupler.

BRIEF SUMMARY OF THE INVENTION

A first structural component of the instant inventive trailer lock comprises a rigid steel enclosure having a floor, a ceiling, a left wall, and a right wall. In a preferred embodiment, the enclosure is seamed, segmented, or divided so that wall structures of the enclosure, including at least the enclosure's ceiling, may move between first and second positions. In the first position, the enclosure's ceiling component overlies the enclosure's floor component. In the second position, the enclosure's ceiling component is displaced away from the first position in order to open the enclosure and to expose the floor for an insertion of a trailer tongue coupler component.

A further structural component of the instant inventive trailer lock comprises a bolt which is fixedly attached to and extends upwardly from the lock's floor component. In a preferred embodiment, the bolt component has an enlarged head which is preferably cylindrical or disk shaped, and which is fitted for nesting receipt within the downwardly opening forward towing ball receiving socket which is commonly present at the front end of the trailer tongue coupler. In a preferred embodiment, the invention's bolt component is adapted for selective telescoping upward extension and downward retraction, such adaptation preferably incorporating mating helical threads.

A further structural component of the instant invention comprises releasable latching means which may engage a padlock and which are connected operatively to the enclosure for alternatively holding the ceiling component at its first position and releasing the ceiling component for movement to its second position. In a preferred embodiment, such latching means comprise alignable eyes which are adapted for receiving a hasp of the padlock.

In a preferred embodiment, the instant inventive lock further comprises an operatively connected hinge which is positioned for alternatively holding the ceiling component at the first and facilitating pivoting of the ceiling to the second position. Suitably, the hinge component is mounted oppositely from the latching means component for opening and closing the enclosure in a clam shell fashion.

Further structural components of the instant inventive lock comprise at least a first hook eye, and preferably a pair of hook eyes. The invention's hook eye components are preferably positioned at and extend through a wall structure selected from the group consisting of the lock's floor, the lock's left wall, the lock's right wall, the lock's ceiling, a floor to wall transition or corner of the lock, and a wall to ceiling transition or corner of the lock. In the preferred embodiment, the hook eyes are further positioned so that upon receipt of the trailer tongue coupler component within the lock's enclosure, upon engagements of trailer chain hooks within the hook eyes, and upon latched closure of the lock's enclosure, the trailer tongue coupler advantageously further functions as a hook extraction stop. In performance of its function as a stop, the tongue coupler prevents disengagements of the hooks from the hook eyes. Simultaneously, the overlying first position orientation of the lock's ceiling holds the trailer tongue coupler within the lock to assure continuity of such hook stop function while the enclosure is closed and locked.

Accordingly, the instant inventive lock performs a subsidiary and additional hook locking function while the primary tongue coupler locking function is being performed. Thus, the instant invention provides additional protection against a trailer thief who seeks to alternatively utilize the trailer's safety chains and hooks to perform trailer towing.

Accordingly, objects of the instant invention include the provision of a trailer lock which incorporates structures as described above, and which arranges those structures in manners described above for the achievement of the beneficial functions described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
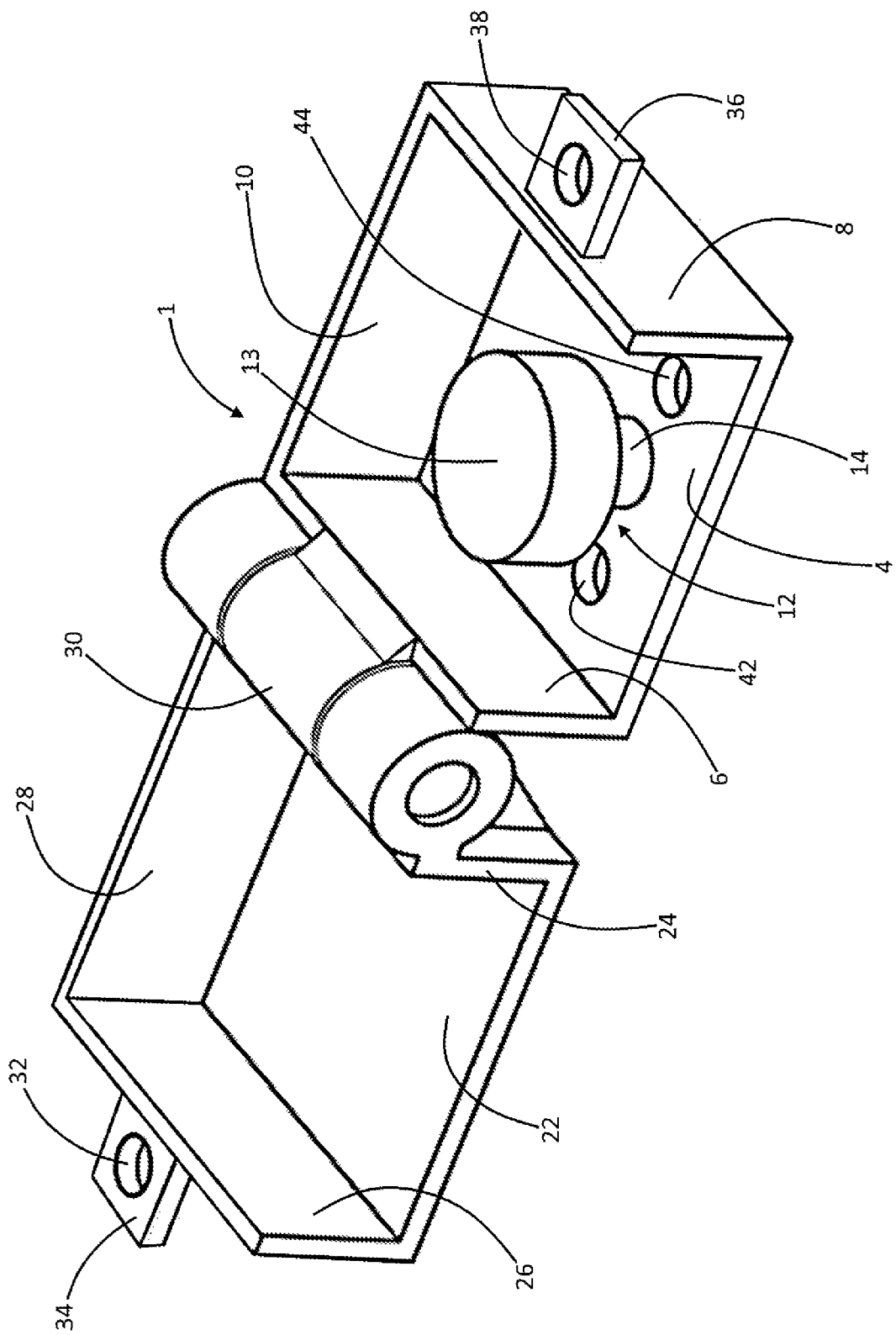
FIG. 1 is a perspective view of a pivoting clam shell enclosure component of the instant inventive trailer locking assembly.
Figure 2:
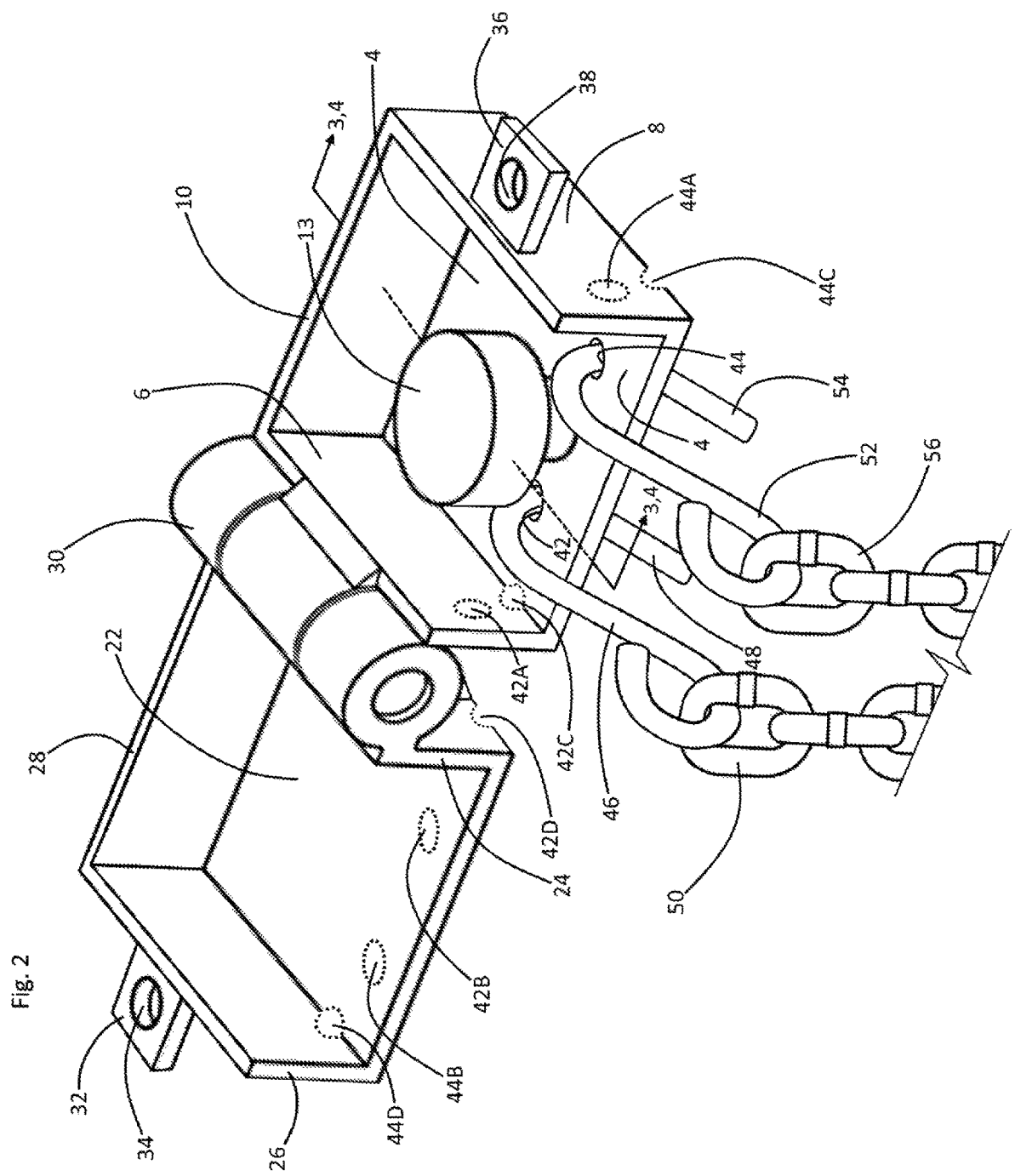
FIG. 2 redepicts the structure of FIG. 1, the view of FIG. 2 showing trailer safety chains engaged.
Figure 3:
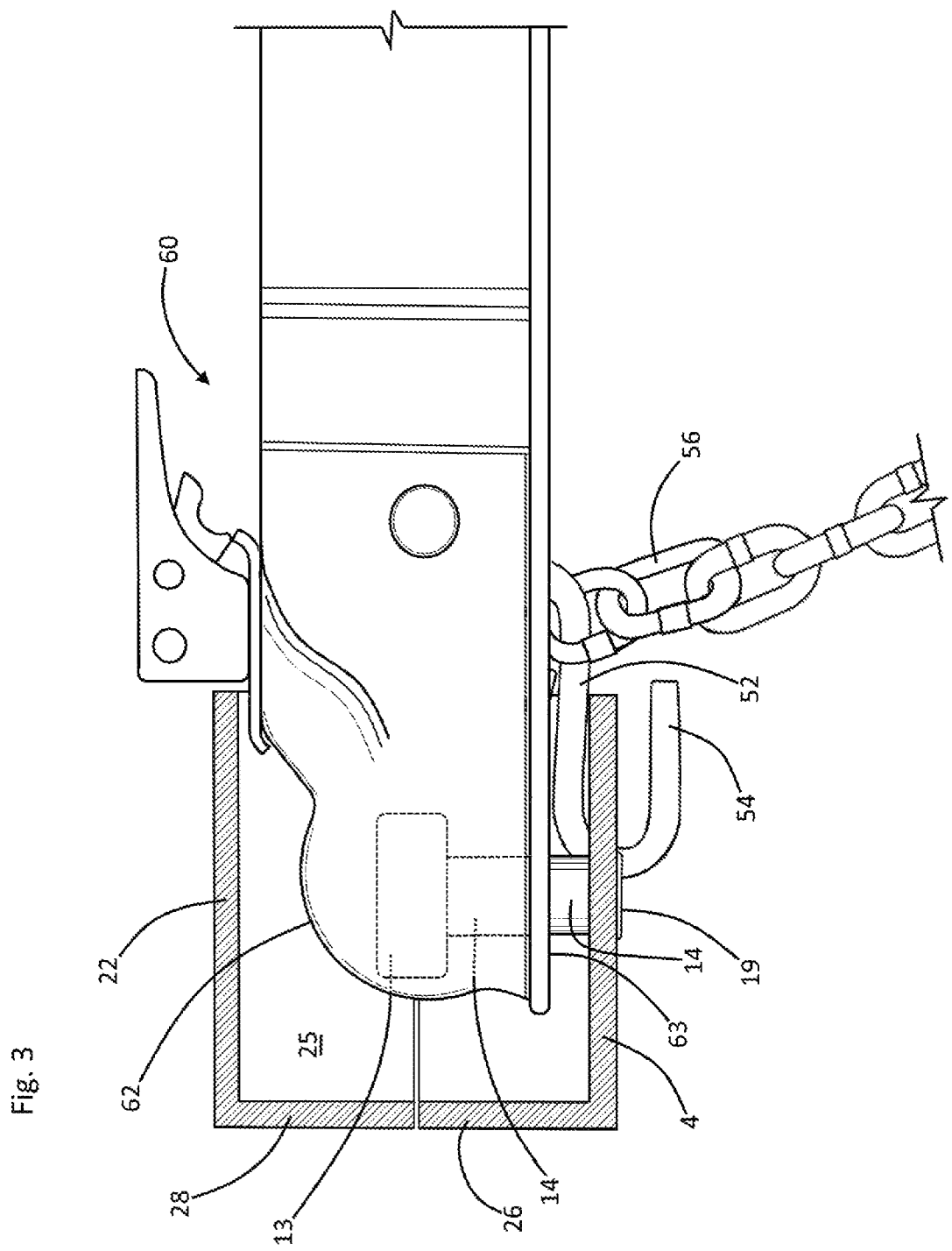
FIG. 3 is a sectional view as indicated in FIG. 2, the view showing the clam shell component in its closed configuration, and showing receipt of trailer tongue coupler components.
Figure 4:
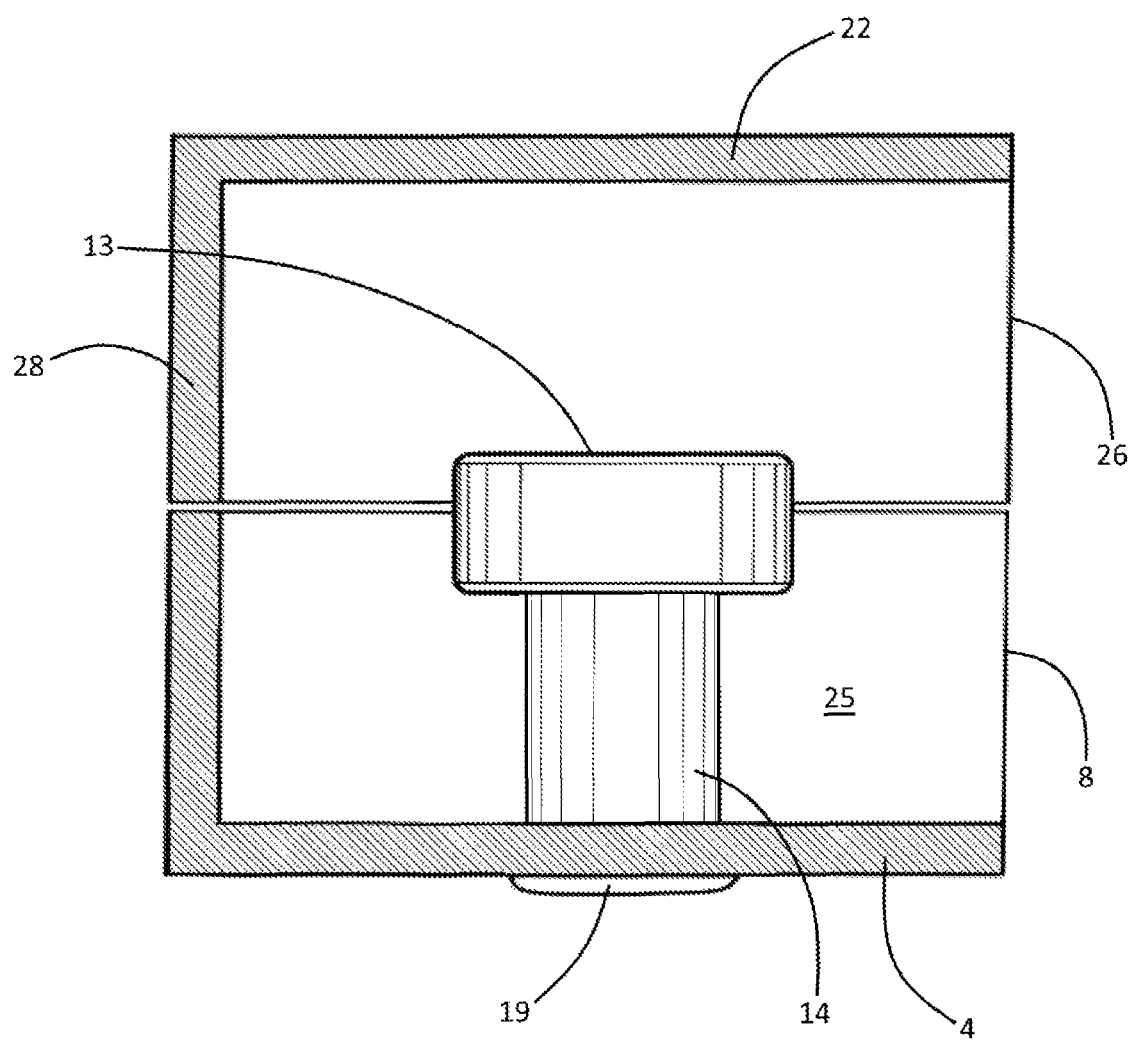
FIG. 4 is an alternative configuration of the structure depicted in FIG. 3.

Referring now to the drawings and in particular to Drawing FIGS. 1 and 2, a clam shell component of the instant inventive trailer locking assembly is referred to generally by Reference Arrow 1. The clam shell component 1 has a floor 4, a ceiling 22, a right wall lower half 8, a left wall lower half 6, a right wall upper half 26, and a left wall upper half 24. The assembly 1 preferably further has front wall upper and lower halves 28 and 10. A hinge 30 guides movements of the upper half wall and ceiling components 24, 26, 22, and 28 between a first closed position, as indicated in FIGS. 3 and 4, wherein the ceiling 22 overlies the floor 4, and an opened position, as indicated in FIG. 1, wherein the ceiling 22 is displaced away from such first position.

A latching assembly 36,38,32,34, is preferably provided for, upon pivoting movement of the ceiling of its first position, aligning eye 34 with eye 38, and allowing a hasp of padlock (not depicted within views) to be inserted and engaged therethrough. The tabs 32,36 and eyes 34,38 of FIGS. 1 and 2 are intended as being representative of other commonly configured padlock engaging brackets.

A bolt component is referred to generally by Reference Arrow 12. Such bolt 12 is preferably fixedly attached to and extends upwardly from the floor 4, such bolt being affixed by means of, referring to FIG. 4, a weld 19. In a suitable embodiment, the bolt 12 has an enlarged disk shaped upper end 13 for secure nesting receipt within a downwardly opening socket of, for example referring to FIG. 3, a downwardly opening socket 62 of trailer towing tongue coupler 60. A support column 14 of the bolt 12 preferably extends downwardly from head 13 for welded attachment 19 to the floor 4.

Referring to FIG. 1, chain hook receiving eyes 42 and 44 suitably extend through the floor 4. Referring further simultaneously to FIG. 2, the chain hook receiving eyes may alternatively extend through side walls 6 and 8, as indicated by dashed line openings 42A and 44A. Further alternatively, such eyes may extend through ceiling 22 as indicated by dashed line openings 42B and 44B. Further alternatively, such eyes may extend through floor to side wall transitions or corners as indicated by dashed line openings 42C and 44C. Further alternatively, such eyes may extend through ceiling to side wall transitions or corners as indicated by dashed line openings 42D and 44D. The transition or corner positioned openings 42C, 44C, 42D, and 44D may advantageously allow, referring further simultaneously to FIG. 3, the shafts of hooks 46 and 52 and the front end of hitch coupler 60 to reside together within the interior space 25 of the enclosure while the enclosure is closed.

In assembly and operation of the instant invention, the clam shell lock component 1 may be initially opened, as indicated in FIG. 1. Thereafter, hooks 46 and 52 secured at the ends of trailer safety chains 50 and 56 may be extended respectively through hook eyes 42 and 44 so that the tails 48 and 54 of such hooks extend downwardly therethrough. Thereafter, the ball socket 62 of the tongue coupler 60 may be placed downwardly over the head 13 of bolt 12 as indicated in FIG. 3. Thereafter, walls 24, 26 and 28, along with ceiling 22 may be pivoted clockwise from the FIG. 2 position to the FIG. 3 position so that ceiling 22 overlies coupler 60 as indicated in FIG. 3. Thereafter, a hasp of a padlock (not depicted within views) may be extended through eyes 34 and 38 to effectively latch and secure the clam shell enclosure 1 in the first closed configuration indicated in FIG. 3. In such configuration, ceiling 22 working in combination with bolt 12 constitute a primary locking component which prevents any extraction of the coupler 60 from interior space 25. Such resistance against extraction of coupler 60 assures that an exterior surface of the coupler resides within space 25 at a location where it may function as a hook extraction stopping secondary locking component. The extraction stopping function which the instant invention mechanically ascribes to the coupler 60 advantageously prevents the hooks 46 and 52 from disengaging from hook receiving eyes 42 and 44.

In the example of FIG. 3, the particular hitch coupler exterior surface which functions as a hook extraction stop comprises the coupler's lower surface 63. Where differently positioned hook receiving eyes receive the hooks 46 and 52 (eg. laterally paired eyes 42A,44A, 42B,44B, 42C,44C, or 42D,44D), different upwardly oriented or downwardly oriented exterior surfaces of the coupler similarly constitute a hook extraction stop component which assists in performing the hook extraction stopping function.

Accordingly, the instant inventive assembly allows the clam shell enclosure 1 to incorporate the tongue coupler 60 as a secondary locking component for additionally securing the hook chains 50 and 60. The coupler 60, the extreme forward end of which is secured within interior space 25, advantageously performs the function of an extraction stop for additionally preventing hook disengagement, thereby frustrating a trailer thief's attempts to utilize chains 50 and 56 for trailer towing.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A lock for securing a hitch coupler and for securing at least a first safety chain hook, the hitch coupler having a plurality of surfaces and being attached at a forward end of a trailer's towing tongue, and the at least first safety chain hook being attached by the safety chain to the towing tongue, the lock comprising:
   (a) a primary locking component comprising an enclosure having a floor and a ceiling;
   (b) a bolt fixedly attached to and extending into the enclosure from the floor;
   (c) a seam segmenting the primary locking component, the seam facilitating movements of the ceiling between a first position and a second position, wherein, upon a movement of the ceiling to the first position, the ceiling overlies the bolt, and wherein, upon a movement toward the second position, the ceiling displaces away from the first position;

(d) a releasable latch fixedly attached to the primary locking component, said latch being adapted for resisting the movements of the ceiling toward the second position; and (e) a secondary locking component comprising at least a first chain hook receiving eye, said eye opening into the enclosure.

2. The lock of claim 1 wherein the enclosure comprises a plurality of side walls, the seam segmenting said walls.

3. The lock of claim 2 wherein the at least first chain hook receiving eye is positioned at a structure selected from the group consisting of the floor, the ceiling, and the side walls.

4. The lock of claim 3 wherein the secondary locking component comprises a second chain hook receiving eye.

5. The lock of claim 4 further comprising a hinge fixedly attached to the enclosure, the hinge being adapted for guiding the motion of the ceiling toward the second position.

6. The lock of claim 5 wherein the releasable latch comprises a pair of tabs having alignable eyes.

7. The lock of claim 6 wherein the bolt comprises a support column having an upper end, and further comprising an enlarged head fixedly attached to said upper end.

8. The lock of claim 7 wherein the support column comprises a helically threaded sleeve and shaft combination.

9. The lock of claim 4 wherein, upon a receipt of the hitch coupler within the enclosure, and upon an engagement of the bolt with said coupler, the secondary locking component comprises one of said coupler's surfaces.

10. The lock of claim 9 wherein the selected structure at which the at least first chain hook receiving eye is positioned comprises the floor, and wherein the second chain hook receiving eye further opens the enclosure at the floor.

11. The lock of claim 10 wherein the secondary locking component's one of the hitch coupler's surfaces comprises a lower hitch coupler surface.

12. The lock of claim 11 wherein the at least first chain hook receiving eye is closely fitted for receiving the at least first safety chain hook.

13. The lock of claim 12 further comprising a hook extraction stop, said stop comprising the hitch coupler's lower surface.

* * * * *